United States Patent [19]

Bender

[11] 4,303,747
[45] Dec. 1, 1981

[54] EXPANDED-METAL GRID

[75] Inventor: Ulrich Bender, Siegen, Fed. Rep. of Germany

[73] Assignee: Firma Emil Bender, Siegen, Fed. Rep. of Germany

[21] Appl. No.: 163,433

[22] Filed: Jun. 27, 1980

[30] Foreign Application Priority Data

Dec. 19, 1979 [DE] Fed. Rep. of Germany ... 7935703[U]
Mar. 27, 1980 [DE] Fed. Rep. of Germany ....... 3011836

[51] Int. Cl.³ .............................................. H01M 4/74
[52] U.S. Cl. .......................................... 429/161; 29/2;
29/6.1; 429/211; 429/242
[58] Field of Search ........................ 429/161, 211, 242;
29/2, 6.1, 6.2

[56] References Cited

U.S. PATENT DOCUMENTS

| 3,275,473 | 9/1966 | Barnett et al. | 429/242 |
| 3,310,438 | 3/1967 | Huffman et al. | 429/242 |
| 3,945,097 | 3/1976 | Daniels et al. | 429/242 |

Primary Examiner—Donald L. Walton
Attorney, Agent, or Firm—Karl F. Ross

[57] ABSTRACT

A rectangular grid for supporting the active mass of a plate for an electric battery is formed by slitting a metal sheet to produce mutually staggered tiers of cuts, adjacent tiers being separated by distances substantially less than the sheet thickness. Upon a subsequent stretching of the slitted sheet to expand the cuts into generally rhomboidal meshes, the webs bounding these cells are twisted whereby the nodes connecting them, which are formed by the unslitted parts of the several tiers, are tilted onto their sides; with proper dimensioning, the flanks of the tilted nodes are substantially coplanar with the faces of two border strips which extend along the major sides of the rectangle and are formed integral with the grid from unslitted sheet portions. One of these border strips is integral with a terminal tab of reduced thickness extending over slightly less than half the length of that strip.

9 Claims, 15 Drawing Figures

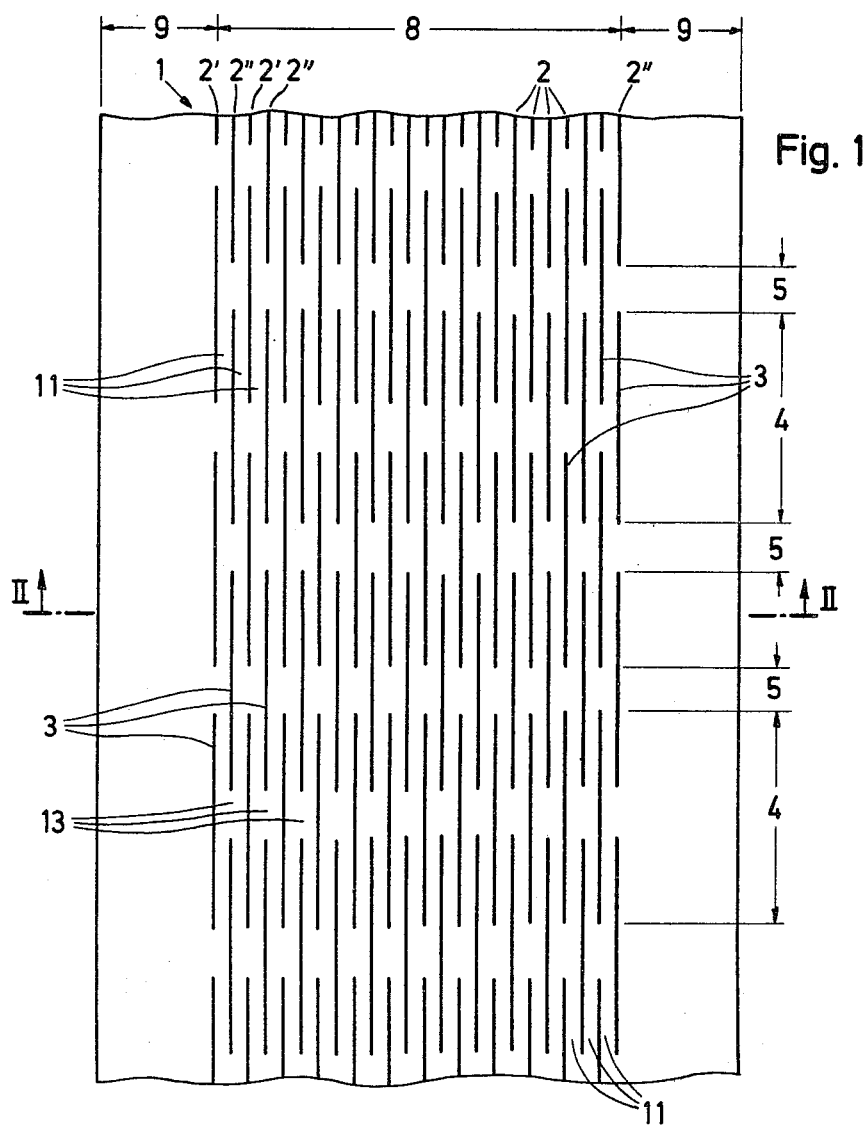
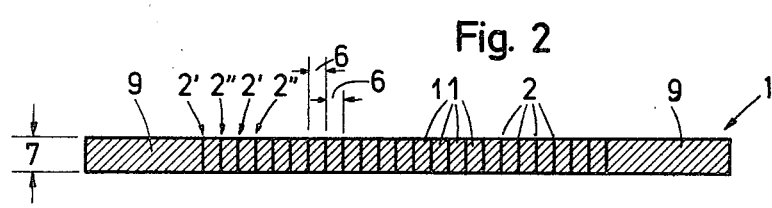

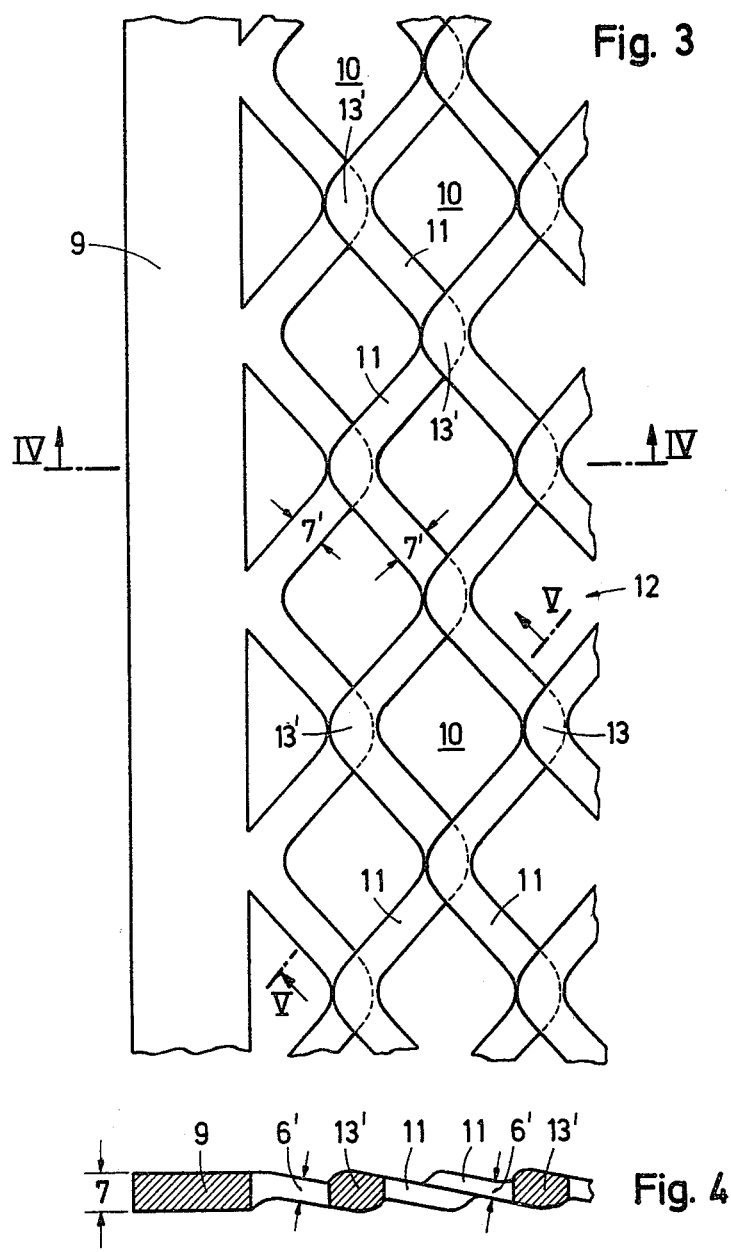
Fig. 3
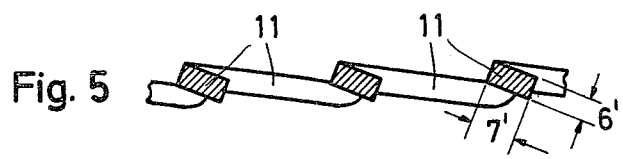
Fig. 4
Fig. 5

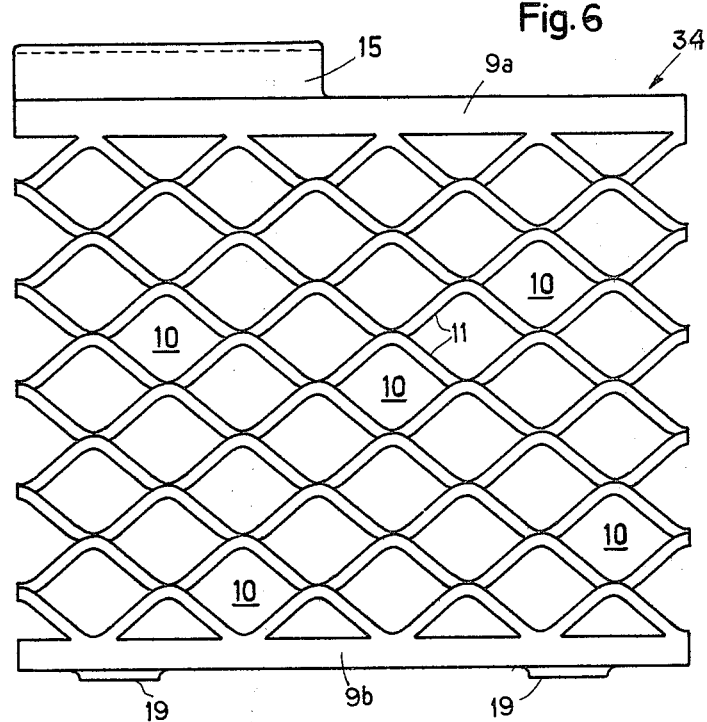
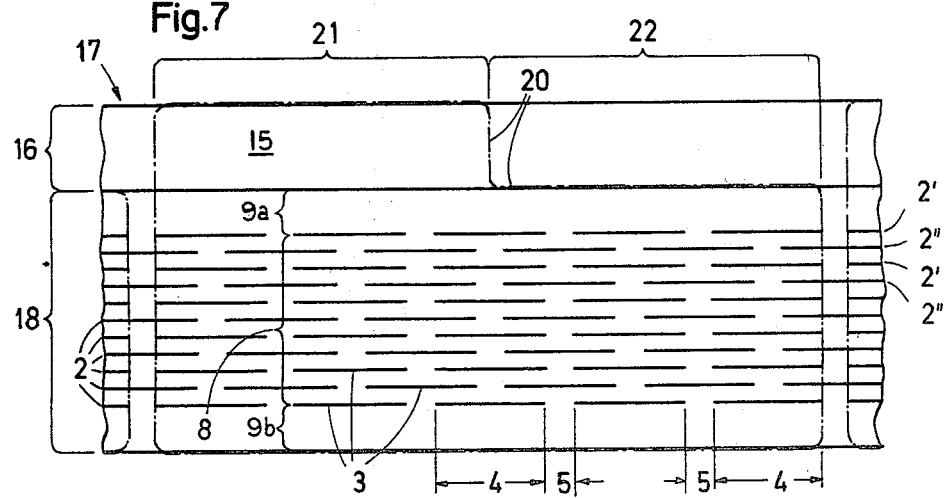

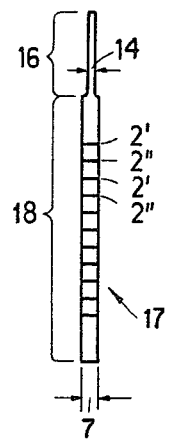
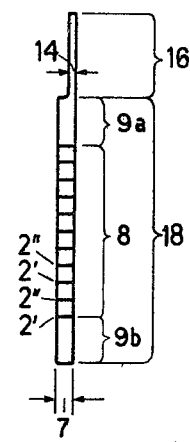
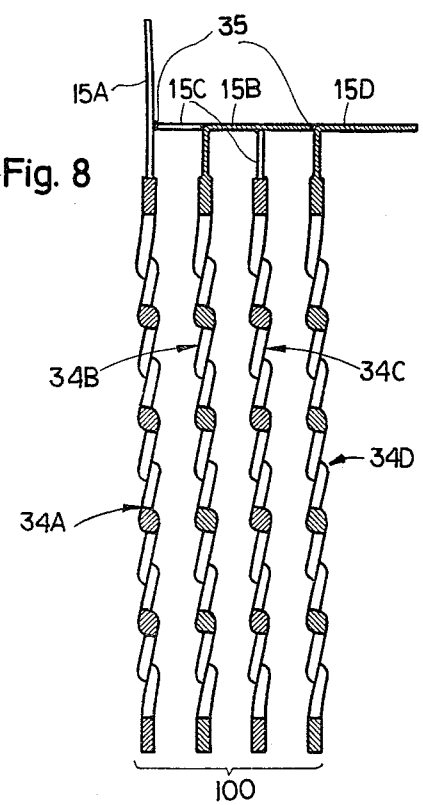

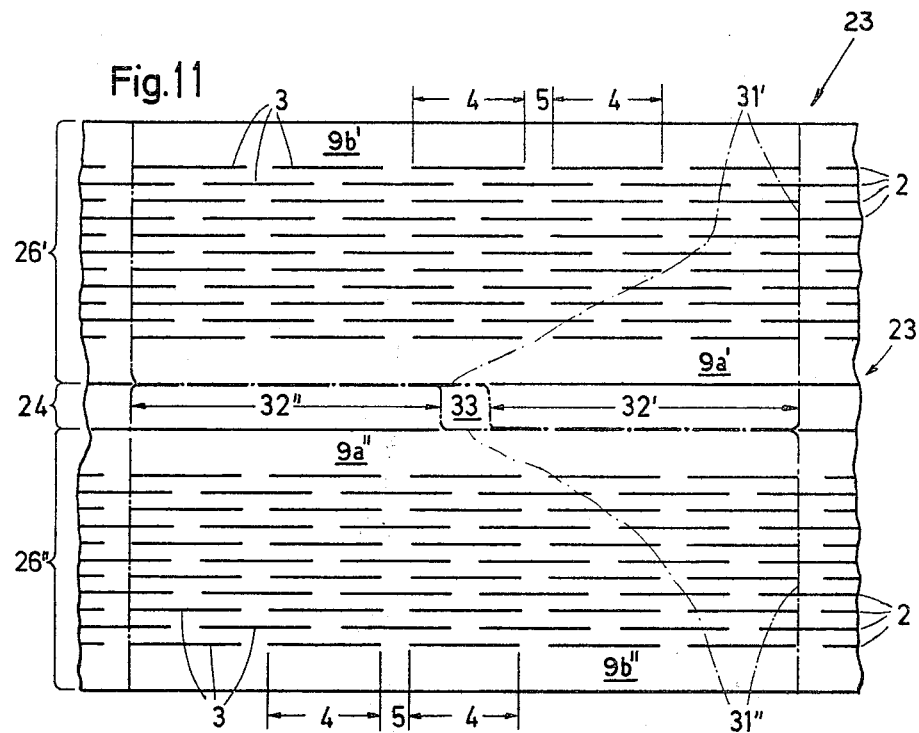
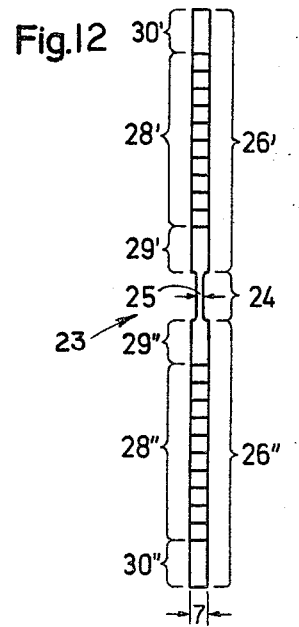
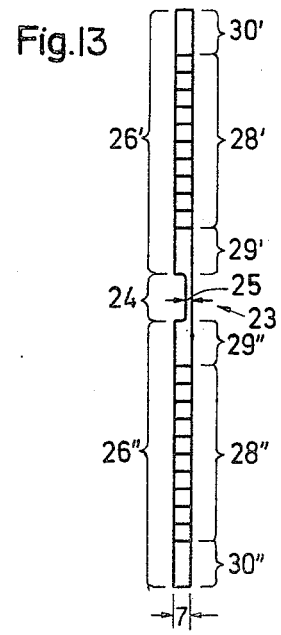

EXPANDED-METAL GRID

FIELD OF THE INVENTION

My present invention relates to an expanded-metal grid, serving as a support for the active material of a battery plate.

BACKGROUND OF THE INVENTION

The use of such expanded-metal grids in the plates of electrical batteries, especially those of the lead-acid type, is already well known. Reference in this connection may be made, for example, to U.S. Pat. Nos. 3,853,626, 3,945,097 and 4,102,024. Thus, as described in these prior patents, the grid is produced by slitting a sheet of lead or other metal to form a multiplicity of tiers of longitudinally separated cuts, with relative staggering by half a pitch in adjacent tiers, and then stretching the sheet to expand these cuts into generally rhomboidal meshes or cells. The meshes are bounded by webs of the metal interconnected by nodes of twice the web width, the webs and the nodes experiencing a twisting action during the stretching operation whereby the nodes are turned through almost 90° from their original positions. With the use of thin sheets (thickness up to about 0.05 inch or 1.25 mm as suggested in the two first-mentioned patents), and with webs having a width of the same order of magnitude, the height of the twisted nodes substantially exceeds the thickness of the sheet whereby these nodes project beyond the levels of the faces of a pair of solid border strips formed by unslitted sheet portions on opposite edges of the rectangular grid area; the usual ratio of sheet thickness to web width lies between 1:1.2 and 1:1.3. Since the projecting nodes would constitute discontinuities in the surface of the pasted-up plate, it becomes necessary to subject the grid to a separate flattening operation which, however is resisted by the solid reinforcing strips; the latter, accordingly, must undergo a certain lengthening process. The equipment needed for these supplemental operation is cumbersome and expensive.

The preference of the art for thin metal sheets is partly due to the realization that battery grids die-cut from such a sheet, formed with integral terminal tabs which project beyond their generally rectangular outlines, unavoidably leave a certain residue in the form of scrap metal which becomes more significant as the sheet thickness increases. With heavier sheets the width of the tabs can be reduced for a given cross-sectional area, as determined by the maximum permissible electrical resistance, yet this only increases the amount of metal going to waste.

OBJECTS OF THE INVENTION

An important object of my present invention is to provide an improved support structure of the character referred to which obviates the need for supplemental operations as discussed above.

Another object is to provide a structure of this character which minimizes the amount of scrap metal generated in the die-cutting process.

SUMMARY OF THE INVENTION

In accordance with a feature of my present invention, the spacing of the tiers of the slitted sheet (before expansion) is chosen to be less than the sheet thickness, preferably about half that thickness, so that the resulting webs have a substantially rectangular cross-section whose major dimension includes an angle of less than 45° with the faces of the unslitted marginal sheet portions forming the aforementioned border strips integral with the grid. The height of the nodes perpendicular to these faces, equaling substantially twice the distance between the tiers which in turn corresponds to the minor dimension of the cross-section of the webs, can thus be made about equal to the thickness of the border strips without requiring any additional flattening or lengthening steps. A suitable minimum value for the tier spacing and thus for the web width is 0.3 times the sheet thickness.

Pursuant to another feature of my invention, advantageously used in combination with the improvement described above, a terminal tab integrally adjoining one of the border strips has a thickness substantially less than that of these strips. Such a tab can be cut, upon a severing of the slitted grid area and its border strips from the remainder of the sheet, out of a zone of reduced sheet thickness adjacent one of these solid strips.

The terminal tab so formed generally extends over less than half the length of the adjoining solid strip, starting at an end of that strip, in order that the tabs of positive and negative plates can be interleaved in the battery case (with interposition of the usual separators) with their tabs relatively offset to avoid the risk of short circuits. For a further reduction of the scrap I prefer to dispose the zone of reduced thickness between two substantially symmetrical sheet portions of larger thickness designed to form a pair of grids that are then severed from each other along with integral terminal tabs cut from respective parts of that zone. In some instances it may be desirable to cut the terminal tabs in part from marginal strip sections of the respectively opposite grid areas adjoining the reduced zone, thereby providing these tabs with free edge portions of greater thickness (equal to that of the border strips) facilitating their soldering or welding to tabs of adjoining grids of the same polarity.

BRIEF DESCRIPTION OF THE DRAWING

The above and other features of my invention will now be described in detail with reference to the accompanying drawing in which:

FIG. 1 is a face view of part of a slitted metal sheet designed to form a supporting grid according to my invention;

FIG. 2 is a cross-sectional view taken on the line II—II of FIG. 1; FIG. 3 is an enlarged face view of an expanded segment of the sheet portion shown in FIG. 1;

FIGS. 4 and 5 are cross-sectional views respectively taken on the lines IV—IV and V—V of FIG. 3;

FIG. 6 is a face view of a complete supporting grid provided with a terminal tab according to my invention;

FIG. 7 is a face view of part of a slitted but still unexpanded metal sheet from which the grid of FIG. 6 can be produced by die-cutting and stretching;

FIG. 8 is a part-sectional side view of a stack of supporting grids of the type shown in FIG. 6;

FIG. 9 is an end view of the unexpanded sheet portion of FIG. 7;

FIG. 10 is a view similar to FIG. 9, illustrating a modification;

FIG. 11 is a view similar to FIG. 7, showing part of an unexpanded sheet from which two grids of the type illustrated in FIG. 6 can be produced;

FIG. 12 is an end view of the sheet section shown in FIG. 11;

FIG. 13 is a view similar to FIG. 12, illustrating a modification;

SPECIFIC DESCRIPTION

Figure 14:
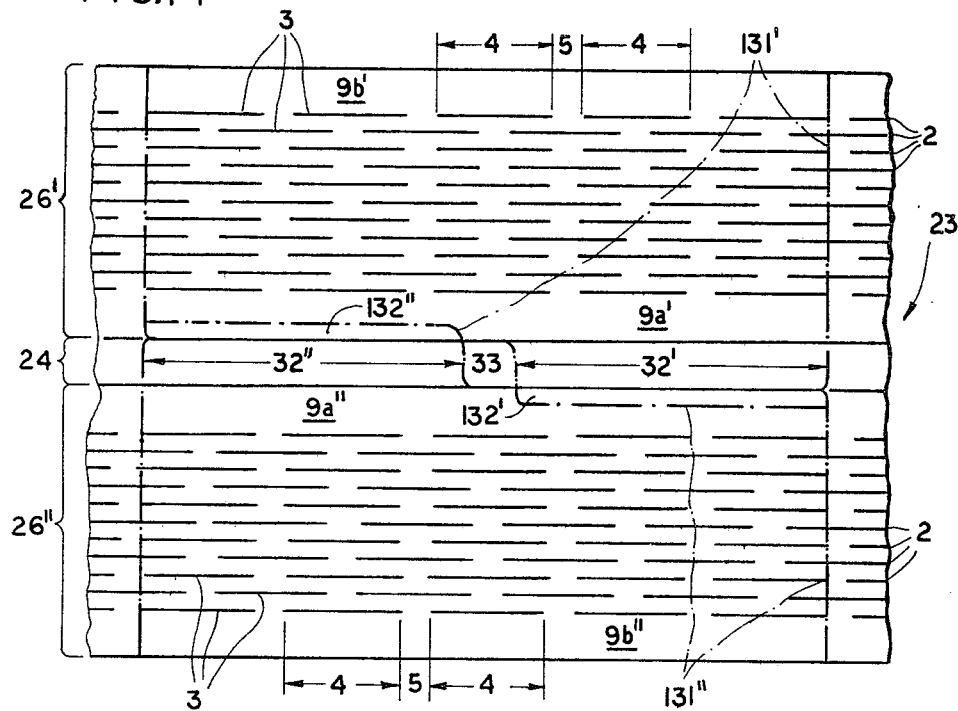
FIG. 14 is a view similar to FIG. 11, illustrating a modified die cut.

In FIGS. 1 and 2 I have shown part of a metal sheet 1 which may consist of lead or its alloys but which could also be made from other alloys such as aluminum and copper, nickel and iron, or nickel and cadmium. A central area 8 of the sheet, bounded by two solid marginal strips 9, is slitted to form a multiplicity of elongate cuts 3 of uniform length 4 arrayed in a number of tiers 2 parallel to the strips 9. Within each tier the cuts 3 are longitudinally separated by solid portions 13 whose length 5 is a minor fraction of the slit length 4, preferably about one fifth thereof. The cuts of adjacent tiers 2' and 2" are relatively staggered by half a pitch, i.e. by half the distance 4+5.

The tiers 2 are spaced apart by narrow webs 11 whose width 6 is substantially half the thickness 7 of the sheet 1. Thus, webs 11 have a rectangular cross-section with minor sides 6 and major sides 7. When these webs are subsequently separated to expand the sheet as shown in FIGS. 3-5, they become the boundaries of generally rhomboidal meshes 10 in a latticework 12 integral with border strips 9. During the expansion step, as best seen in FIG. 5, the webs 11 are turned through an angle close to 90° whereby their rectangular cross-sections come to lie with their major dimensions 7' almost parallel to the faces of strips 9. The solid portions 13 of FIG. 1, whose width equals twice the web width 6, undergo a similar rotation to become nodes 13' whose height transverse to the faces of strips 9 equals about twice the minor dimension 6' of the cross-section of the rotated webs and is thus substantially equal to the original sheet thickness 7. Dimensions 6' and 7' differ only slightly, if at all, from dimensions 6 and 7 of the undeformed webs.

The grid 12 thus obtained can be packed with active electrode material, such as that used for the plates of a lead-acid storage battery, without any further treatment.

In FIG. 6 I have shown a complete grid 34 of the type partly illustrated in FIGS. 3-5, its mesh-forming webs 11 being bracketed by two marginal solid strips 9a and 9b of which the first forms an upper border and the second forms a lower border of an electrode plate when the grid is inserted into a battery casing after being loaded with active material. The top strip 9a is formed integral with a terminal tab 15 which is horizontally bent over, as indicated by a dotted line, in a manner more fully illustrated in FIG. 8 described hereinafter. Bottom strip 9b is integrally formed with a pair of very short legs 19 designed to facilitate circulation of electrolyte below the stack of plates. Both the tab 15 and the legs 19 are of reduced thickness, compared with the strips 9a and 9b, so that the die-cutting thereof from a rectangular sheet leaves only a small amount of scrap. Legs 19 are optional and will not be considered in the description of subsequent Figures.

FIG. 7 shows a section of a sheet 17 from which the grid of FIG. 6 (without legs 19) is to be die-cut. The sheet, shown in its slitted but unexpanded form, is divided into a main portion 18 integrally adjoining a narrower zone 16 of reduced thickness. The border strips 9a and 9b as well as the webs 11 of FIG. 6 all form part of the heavier sheet portion 18 whereas tab 15 is excised from zone 16 when the grid is die-cut along an outline 20. The length 21 of tab 15 is slightly less than half the length of solid strips 9a and 9b. The remaining segment of zone 16, having a length 22, is discarded as scrap.

As seen in FIG. 9, which shows the profile of sheet section 17, reduced zone 16 has a thickness 14 which is about a third of the thickness 7 of the major sheet portion 18. Zone 16 is here symmetrically centered with reference to that major sheet portion; in FIG. 10, on the other hand, this zone is shown shifted so as to be flush with one of the major surfaces of sheet portion 18.

FIG. 8 shows a stack 100 of four grids 34A-34D of the type illustrated in FIG. 6, with tabs 15A-15D centered in the thickness dimension as in FIG. 9. With grids 34A and 34C designed to form battery plates of one polarity interleaved with plates of the opposite polarity formed from grids 34B and 34D, tabs 15A and 15C are laterally offset from tabs 15B and 15D. Moreover, tab 15B is bent over so that its free edge touches the elbow of tab 15D to which it is bonded by welding or soldering. In a similar manner, tab 15C is bent over and heat-bonded to tab 15A. The junctions thus formed between the tabs of successive plates of like polarity have been indicated at 35. The tabs at the ends of the stck 100, which could include additional plates of both polarities, may be left unbent to serve as output terminals as illustrated for tab 15A. The usual separators interposed between the plates in the battery have not been shown.

FIGS. 11 and 12 show part of a wider sheet 23 with two major portions 26' and 26" of larger thickness 7 separated by an intervening zone 24 of reduced thickness 25 from which two grids with respective terminal tabs can be formed by die-cutting along outlines 31' and 31". Sheet portion 26' has a slitted central area 28' between solid strips 29' and 30' designed to form top and bottom borders 9a' and 9b'; similarly, sheet portion 26" has a slitted central area 28" between solid strips 29" and 30" designed to form top and bottom borders 9a" and 9b". The tab for the first grid extends along border strip 9a' over a fractional length 32' thereof. Similarly, the tab of the second grid extends along border strip 9a" over a fractional length 32" thereof which like length 32' is slightly less than half the grid length so that only a small residue 33 of zone 24 remains after the two grids with their tabs have been severed from the remainder of the sheet. FIG. 13 shows the sheet 23 modified to have its reduced section 24 offset from its midplane and flush with the major sheet portions 26' and 26".

It will be noted that tabs 15a-15d of FIG. 8 have a height (before bending) substantially exceeding that of the top and bottom strips of the grids. For the formation of these grids, therefore, the width of zone 24 in FIGS. 11-13 would have to be considerably increased relative to the remainder of the sheet.

Figure 15:
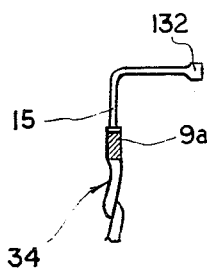
FIG. 15 is a fragmentary part-sectional view similar to a portion of FIG. 8, showing part of a grid produced with the die cut of FIG. 14.

In FIG. 14 I have shown the same sheet 23 as in FIGS. 11-13 but with modified outlines 131' and 131" for the die cuts, these outlines extending partly into the adjoining strip zones of the opposite sheet portions so that the two terminal tabs are extended in height by sheet sections 132' and 132" of greater thickness cut from strips 9a" and 9a', respectively. A grid 34 with a tab 15 ending in a reinforced edge portion 132, obtained by such a die cut, has been partly illustrated in FIG. 15; edge portion 132, whose thickness corresponds to that of the adjacent border strip 9a, is part of the horizontally bent leg of the tab designed to be thermally bonded to another such tab as described with reference to FIG. 8.

Although the cross-sections of the webs 11 bounded by slits 3 have been shown nearly square in FIGS. 9, 10, 12 and 13, I prefer to use rectangular cross-sections with a side ratio between about 10:3 and 10:7 also in the embodiments of FIGS. 6–15.

I claim:

1. A support for the active material of a battery plate, comprising a unitary metallic grid of generally rectangular outline with a multiplicity of generally rhomboidal meshes bounded by webs of substantially rectangular cross-section and a pair of solid border strips integral with said webs on opposite sides of said grid, the minor dimension of said cross-section being substantially equal to half the thickness of said strips, the major dimension of said cross-section being substantially equal to the thickness of said strips and including an angle of less than 45° with the faces of said strips, the webs of adjacent meshes being interconnected by nodes whose height perpendicular to said faces equals substantially twice the minor dimension of said cross-section.

2. A support as defined in claim 1, further comprising a terminal tab integrally adjoining one of said strips, said tab having a thickness substantially less than that of said strips.

3. A support for the active material of a battery plate, comprising a unitary metallic grid of generally rectangular outline with a multiplicity of generally rhomboidal meshes bounded by webs of substantially rectangular cross-section, a pair of solid border strips integral with said webs on opposite sides of said grid, and a terminal tab integrally adjoining one of said strips, said tab having a thickness substantially less than that of said strips.

4. A support as defined in claim 2 or 3 wherein said tab extends from an end of the adjoining strip to a point spaced from said end by slightly less than the length of said adjoining one of said strips.

5. In combiniation, a multiplicity of supports as defined in claim 3 vertically juxtaposed with their grids parallel to one another and with the tabs of adjacent supports relatively offset along upper edges thereof, thereby forming two interleaved sets of supports with mutually aligned tabs, all but one of the tabs of each set being bent over across intervening supports of the other set and thermally bonded to the tabs of adjoining supports of the same set.

6. The combination defined in claim 5 wherein the bentover tabs have free edge portions of a thickness equal to that of said strips.

7. A support as defined in claim 3 wherein said cross-section has a major dimension and a minor dimension with a ratio in a range between substantially 10:3 and 10:7, said major dimension being substantially equal to the thickness of said strips and including an angle of less than 45° with the faces of said strips, the webs of adjacent meshes being interconnected by nodes whose height perpendicular to said faces equals substantially twice said minor dimension.

8. A support as defined in claim 1 or 7 wherein the height of said nodes substantially equals the thickness of said strips.

9. A support for the active material of a battery plate, comprising:
a unitary metallic grid of generally rectangular outline with a multiplicity of generally rhomboidal meshes bounded by webs of substantially rectangular cross-section and a pair of solid border strips integral with said webs on opposite sides of said grid, the major dimension of said cross-section being substantially equal to the thickness of said strips and including an angle of less than 45° with the faces of said strips, the webs of adjacent meshes being interconnected by nodes whose height perpendicular to said faces equals substantially twice the minor dimension of said cross-section; and
a terminal tab integrally adjoining one of said strips, said tab having a thickness substantially less than that of said strips.

* * * * *